(12) United States Patent
Van Hoff et al.

(10) Patent No.: US 10,158,837 B2
(45) Date of Patent: *Dec. 18, 2018

(54) METHOD AND APPARATUS FOR SECURE TRANSFER AND PLAYBACK OF MULTIMEDIA CONTENT

(71) Applicant: TiVo Solutions Inc., San Carlos, CA (US)

(72) Inventors: Arthur Van Hoff, Alviso, CA (US); James Barton, Los Gatos, CA (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,644

(22) Filed: May 2, 2016

(65) Prior Publication Data

US 2016/0249095 A1   Aug. 25, 2016

Related U.S. Application Data

(63) Continuation of application No. 14/262,557, filed on Apr. 25, 2014, now Pat. No. 9,332,293, which is a
(Continued)

(51) Int. Cl.
H04N 21/436 (2011.01)
H04N 21/61 (2011.01)
(Continued)

(52) U.S. Cl.
CPC ......... *H04N 9/8042* (2013.01); *G06F 3/0481* (2013.01); *G06F 3/04817* (2013.01);
(Continued)

(58) Field of Classification Search
CPC .................... H04N 21/43615; H04N 21/6175
(Continued)

(56) References Cited

U.S. PATENT DOCUMENTS 5,671,412 A    9/1997  Christiano
5,758,068 A    5/1998  Brandt
(Continued)

FOREIGN PATENT DOCUMENTS

GB      375923 A     7/1932
GB      2375923      7/2001
(Continued)

OTHER PUBLICATIONS

U.S. Appl. No. 14/262,557, Notice of Allowance dated Dec. 21, 2015, dated Dec. 21, 2015.
(Continued)

*Primary Examiner* — Jefferey F Harold
*Assistant Examiner* — Justin B Sanders
(74) *Attorney, Agent, or Firm* — Haley Guiliano LLP

(57) ABSTRACT

A method and apparatus for secure transfer and playback of multimedia content enables the secure transfer of multimedia content from a digital video recorder (DVR) to a personal computer (PC) and further to a handheld device. A DVR determines which devices on a Local Area Network (LAN) are authorized to share and/or retrieve content from the DVR. The DVR receives a connection request from a PC on the LAN, authorizes the connection request and establishes a secure connection between the DVR and the PC. Once the secure connection is established, the DVR receives a request for multimedia content from the PC, prepares the multimedia content for transfer and transfers the multimedia content to the PC.

21 Claims, 9 Drawing Sheets

Related U.S. Application Data continuation of application No. 13/023,057, filed on Feb. 8, 2011, now Pat. No. 8,713,605, which is a continuation of application No. 11/285,416, filed on Nov. 21, 2005, now Pat. No. 7,895,633.

(60) Provisional application No. 60/630,398, filed on Nov. 19, 2004.

(51) Int. Cl.

| | | |
|---|---|---|
| *H04N 9/804* | (2006.01) | |
| *G06F 3/0481* | (2013.01) | |
| *G11B 27/32* | (2006.01) | |
| *H04N 5/76* | (2006.01) | |
| *H04N 5/765* | (2006.01) | |
| *H04N 5/85* | (2006.01) | |
| *H04N 5/913* | (2006.01) | |
| *H04N 7/173* | (2011.01) | |
| *H04N 21/239* | (2011.01) | |
| *H04N 21/2543* | (2011.01) | |
| *H04N 21/258* | (2011.01) | |
| *H04N 21/41* | (2011.01) | |
| *H04N 21/414* | (2011.01) | |
| *H04N 21/4143* | (2011.01) | |
| *H04N 21/4147* | (2011.01) | |
| *H04N 21/4227* | (2011.01) | |
| *H04N 21/431* | (2011.01) | |
| *H04N 21/433* | (2011.01) | |
| *H04N 21/4367* | (2011.01) | |
| *H04N 21/4402* | (2011.01) | |
| *H04N 21/4405* | (2011.01) | |
| *H04N 21/4408* | (2011.01) | |
| *H04N 21/442* | (2011.01) | |
| *H04N 21/454* | (2011.01) | |
| *H04N 21/4722* | (2011.01) | |
| *H04N 21/478* | (2011.01) | |
| *H04N 21/4788* | (2011.01) | |
| *H04N 21/63* | (2011.01) | |
| *H04N 21/6543* | (2011.01) | |
| *H04N 21/81* | (2011.01) | |
| *H04N 21/858* | (2011.01) | |
| *H04N 21/21* | (2011.01) | |
| *H04N 21/472* | (2011.01) | |
| *H04N 21/482* | (2011.01) | |
| *H04N 1/21* | (2006.01) | |
| *H04N 5/775* | (2006.01) | |
| *H04N 5/781* | (2006.01) | |
| *H04N 7/088* | (2006.01) | |
| *H04N 9/82* | (2006.01) | |
| *H04N 5/95* | (2006.01) | |
| *H04N 9/83* | (2006.01) | |

(52) U.S. Cl.
CPC ........... *G11B 27/32* (2013.01); *H04N 1/2112* (2013.01); *H04N 5/76* (2013.01); *H04N 5/765* (2013.01); *H04N 5/85* (2013.01); *H04N 5/913* (2013.01); *H04N 7/173* (2013.01); *H04N 7/17309* (2013.01); *H04N 7/17318* (2013.01); *H04N 21/21* (2013.01); *H04N 21/2393* (2013.01); *H04N 21/2543* (2013.01); *H04N 21/25816* (2013.01); *H04N 21/4104* (2013.01); *H04N 21/4122* (2013.01); *H04N 21/4135* (2013.01); *H04N 21/4143* (2013.01); *H04N 21/4147* (2013.01); *H04N 21/41407* (2013.01); *H04N 21/4227* (2013.01); *H04N 21/4312* (2013.01); *H04N 21/4314* (2013.01); *H04N 21/4331* (2013.01); *H04N 21/4334* (2013.01); *H04N 21/4367* (2013.01); *H04N 21/43615* (2013.01); *H04N 21/43622* (2013.01); *H04N 21/4405* (2013.01); *H04N 21/4408* (2013.01); *H04N 21/44204* (2013.01); *H04N 21/440236* (2013.01); *H04N 21/454* (2013.01); *H04N 21/472* (2013.01); *H04N 21/4722* (2013.01); *H04N 21/4788* (2013.01); *H04N 21/47815* (2013.01); *H04N 21/482* (2013.01); *H04N 21/6175* (2013.01); *H04N 21/632* (2013.01); *H04N 21/6543* (2013.01); *H04N 21/812* (2013.01); *H04N 21/858* (2013.01); *H04N 5/775* (2013.01); *H04N 5/7755* (2013.01); *H04N 5/781* (2013.01); *H04N 5/95* (2013.01); *H04N 7/088* (2013.01); *H04N 9/8205* (2013.01); *H04N 9/83* (2013.01); *H04N 21/478* (2013.01); *H04N 2005/91335* (2013.01); *H04N 2005/91364* (2013.01)

(58) Field of Classification Search
USPC .......................................................... 725/38
See application file for complete search history.

(56) References Cited

U.S. PATENT DOCUMENTS

| | | |
|---|---|---|
| 5,765,152 A | 6/1998 | Erickson |
| 5,790,664 A | 8/1998 | Coley et al. |
| 5,940,504 A | 8/1999 | Griswold |
| 6,009,525 A | 12/1999 | Horstmann |
| 6,169,976 B1 | 1/2001 | Colosso |
| 6,226,624 B1 | 5/2001 | Watson et al. |
| 6,263,503 B1 | 7/2001 | Marguiles |
| 6,564,996 B2 | 5/2003 | Hoffman et al. |
| 7,103,906 B1 | 9/2006 | Katz et al. |
| 7,107,608 B2 | 9/2006 | Wagner et al. |
| 7,213,005 B2 | 5/2007 | Mourad et al. |
| 7,457,511 B2 | 11/2008 | Putterman et al. |
| 8,086,575 B2* | 12/2011 | Putterman ........ H04N 21/43615 707/693 |
| 9,332,293 B2 | 5/2016 | Hoff et al. |
| 2001/0049648 A1 | 12/2001 | Naylor et al. |
| 2002/0002523 A1 | 1/2002 | Kossovsky et al. |
| 2002/0032906 A1 | 3/2002 | Grossman |
| 2002/0032907 A1 | 3/2002 | Daniels |
| 2002/0082973 A1 | 6/2002 | Marbach et al. |
| 2002/0143972 A1* | 10/2002 | Christopoulos ... H04L 29/06027 709/231 |
| 2003/0095791 A1 | 5/2003 | Barton et al. |
| 2003/0110503 A1 | 6/2003 | Perkes |
| 2003/0118014 A1* | 6/2003 | Iyer ...................... H04N 5/782 370/389 |
| 2003/0158958 A1 | 8/2003 | Chiu |
| 2003/0192060 A1 | 10/2003 | Levy |
| 2003/0204613 A1 | 10/2003 | Hudson et al. |
| 2003/0220781 A1* | 11/2003 | Salmonsen .......... H04L 12/283 703/25 |
| 2003/0229900 A1* | 12/2003 | Reisman ........... G06F 17/30873 725/87 |
| 2004/0003079 A1 | 1/2004 | Aiu et al. |
| 2004/0086263 A1 | 5/2004 | Arora |
| 2004/0117483 A1 | 6/2004 | Singer et al. |
| 2004/0123129 A1 | 6/2004 | Ginter et al. |
| 2004/0237100 A1 | 11/2004 | Pinder et al. |
| 2004/0250291 A1* | 12/2004 | Rao ..................... H04N 5/76 725/131 |
| 2004/0261093 A1 | 12/2004 | Rebaud et al. |
| 2005/0028208 A1* | 2/2005 | Ellis ..................... H04N 7/163 725/58 |
| 2005/0076359 A1 | 4/2005 | Pierson et al. |
| 2005/0120386 A1 | 6/2005 | Stone |
| 2005/0177853 A1 | 8/2005 | Williams et al. |
| 2005/0204393 A1* | 9/2005 | Bopardikar .... H04N 21/234309 725/81 |

(56) References Cited

U.S. PATENT DOCUMENTS

| | | | |
|---|---|---|---|
| 2005/0283791 A1* | 12/2005 | McCarthy | H04N 7/1675 725/1 |
| 2006/0095472 A1 | 5/2006 | Krikorian et al. | |
| 2006/0127039 A1 | 6/2006 | Van Stam | |
| 2010/0095332 A1* | 4/2010 | Gran | G06F 17/30038 725/93 |
| 2010/0192175 A1* | 7/2010 | Bachet | G06Q 10/0637 725/31 |
| 2011/0135271 A1 | 6/2011 | Van Hoff et al. | |
| 2014/0237514 A1 | 8/2014 | Hoff et al. | |

FOREIGN PATENT DOCUMENTS

| | | |
|---|---|---|
| JP | 2001-160003 | 6/2001 |
| JP | 2004-193920 | 7/2004 |
| JP | 2001-325461 | 11/2011 |
| WO | WO 98/58306 | 12/1998 |
| WO | WO 01/53963 | 7/2001 |
| WO | WO 03/043326 | 5/2003 |
| WO | WO 2004/008289 | 1/2004 |
| WO | WO 2005/060659 | 7/2005 |

OTHER PUBLICATIONS

Australian Patent Office, Application No. 2005306361, Foreign Office Action dated Apr. 22, 2009.
Australian Patent Office, Application No. 2005306361, Pending Claims as of Apr. 22, 2009.
Australian Patent Office, Application No. 2005306362, Foreign Office Action dated Nov. 24, 2009.
Australian Patent Office, Application No. 2005306362, Foreign Office Action dated Jul. 9, 2010.
Australian Patent Office, Application No. 2005306362, Pending Claims as of Nov. 24, 2009.
Australian Patent Office, Application No. 2005306362, Pending Claims as of Sep. 7, 2010.
Canadian Patent Office, Application No. 2,588,630, Foreign Office Action dated Nov. 3, 2009.
Canadian Patent Office, Application No. 2,588,630, Pending Claims as of Nov. 3, 2009.
Chinese Patent Office, Application No. 200580039507.7, Foreign Office Action dated Mar. 27, 2009.
Chinese Patent Office, Application No. 200580039507.7, Pending Claims as of Mar. 27, 2009.
Chinese Patent Office, Application No. 200580041645.9, Foreign Office Action dated Nov. 24, 2011.
Chinese Patent Office, Application No. 200580041645.9, Pending Claims as of Nov. 24, 2011.
Chinese Patent Office, Application No. 201210083646.1, Foreign Office Action dated Oct. 17, 2014.
Chinese Patent Office, Application No. 201210083646.1, Notice of Allowance dated May 27, 2015.
Chinese Patent Office, Application No. 201210083646.1, Pending Claims as of Oct. 17, 2014.
Chinese Patent Office, Application No. 201210083646.1, Pending Claims as of May 27, 2015.
European Patent Office, Application No. 03710648.1, Foreign Office Action dated May 27, 2008.
European Patent Office, Application No. 03710648.1, Pending Claims as of May 27, 2008.
European Patent Office, Application No. 05851949.7, Foreign Office Action dated Jul. 9, 2012.
European Patent Office, Application No. 05851949.7, Pending Claims as of Jul. 9, 2012.
European Patent Office, Application No. 11182065.0, Foreign Office Action dated Dec. 16, 2011.
European Patent Office, Application No. 11182065.0, Foreign Office Action dated Dec. 4, 2015.
European Patent Office, Application No. 11182065.0, Pending Claims as of Dec. 16, 2011.
European Patent Office, Application No. 11182065.0, Pending Claims as of Dec. 4, 2015.
Iannella, R. "Open Digital Rights Language (ODRL): Version 0.9", IPR Systems Pty Ltd. 2001, Jun. 29, 2001 (46 pages).
Japanese Patent Office, Application No. 2007-543364, Foreign Office Action dated Nov. 15, 2011.
Japanese Patent Office, Application No. 2007-543364, Pending Claims as of Nov. 15, 2011.
World Intellectual Property Organization, Application No. PCT/US05/042191, International Search Report and Written Opinion dated May 8, 2006.
World Intellectual Property Organization, Application No. PCT/US05/042191, Pending Claims as of May 8, 2006.
World Intellectual Property Organization, Application No. PCT/US05/042192, Pending Claims as of Sep. 26, 2006.
World Intellectual Property Organization, Application No. PCT/US05/042192, Search Report and Written Opinion dated Sep. 26, 2006.
European Patent Office, Application No. 05851949.7, Notice of Allowance dated May 4, 2016.
European Patent Office, Application No. 05851949.7, Pending Claims as of May 4, 2016.

* cited by examiner

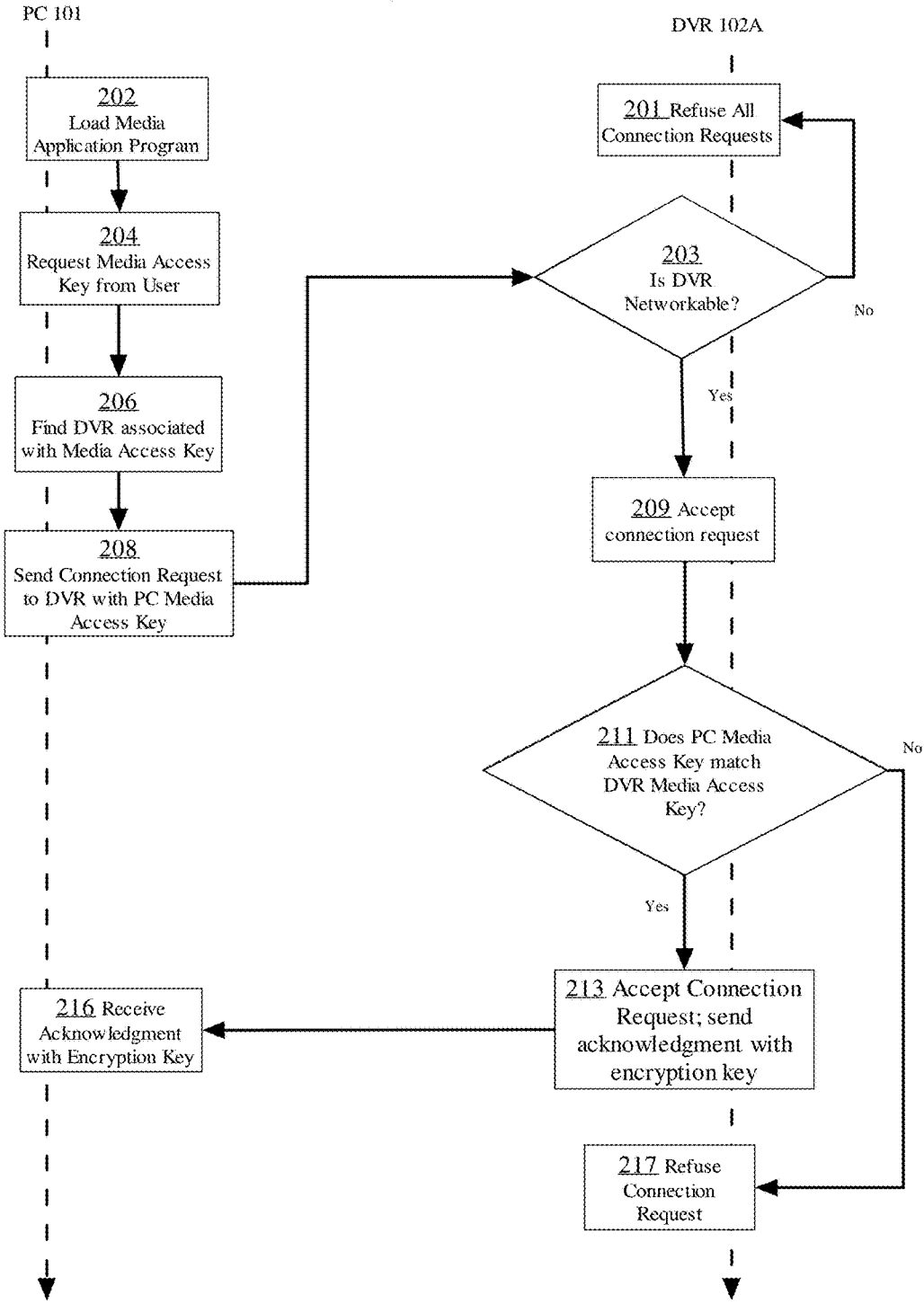

METHOD AND APPARATUS FOR SECURE TRANSFER AND PLAYBACK OF MULTIMEDIA CONTENT

CROSS-REFERENCE TO RELATED APPLICATIONS; PRIORITY CLAIM

This application is a continuation of U.S. Ser. No. 14/262,557, filed Apr. 25, 2014; which is a continuation of U.S. Ser. No. 13/023,057, filed Feb. 8, 2011; which is a continuation of U.S. Ser. No. 11/285,416, filed Nov. 21, 2005, now U.S. Pat. No. 7,895,633 issued Feb. 22, 2011; which claims the benefit of Provisional Appln. 60/630,398, filed Nov. 19, 2004, the entire contents of which is hereby incorporated by reference as if fully set forth herein, under 35 U.S.C. § 119(e). The applicant(s) hereby rescind any disclaimer of claim scope in the parent application(s) or the prosecution history thereof and advise the USPTO that the claims in this application may be broader than any claim in the parent application(s).

FIELD OF THE INVENTION

The invention relates to securely transferring multimedia content between devices in a computer network and securely playing back the multimedia content in a device.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

TV viewers can record broadcasted TV programs using a videocassette recorder (VCR). As such, a VCR user can record a particular TV program at the time it is broadcasted and play the same recorded TV program at a later time. In order to accomplish this, a VCR changes the electrical signals representing a TV program into magnetic signals and stores the magnetic signals on magnetic tape. The magnetic tape is usually in the form of a videocassette tape inserted into the VCR by the VCR user. When a VCR user decides to play back the TV program, the process is reversed, and the VCR changes the magnetic signals stored on the videocassette tape into electrical signals and sends the electrical signals to a TV set.

With the development of digital technology, VCRs are being replaced by digital video recorders (DVRs). Like a VCR, a DVR records broadcasted TV programs for later playback by changing electrical signals of the TV program into digital information and storing the digital information in a memory device. When the user plays back the recorded TV program, the DVR converts the digital information back to analog signals and sends the signals to the TV set which displays the TV program for the viewer.

DVRs are becoming increasingly popular and widely used for recording broadcasted TV programs. While the ability to record and control the playback of recorded TV programs is convenient, DVR users are forced to view recorded TV programs at a TV set connected to the particular DVR which recorded the program. Put differently, a DVR user cannot view recorded TV programs away from the DVR that recorded the program. As a consequence, a drawback typical to a DVR is the inability to view recorded TV programs in multiple locations. However, DVR users desire to watch recorded TV programs away from the DVR that recorded the TV programs.

At the same time, content providers who provide TV programs are concerned with preserving and monitoring copyrighted program material. Thus, content providers do not want DVR users to freely transfer TV programs to unauthorized devices or distribute recorded TV programs to other unauthorized DVR users.

What is desired is to establish a secure communication system through which a user may transfer recorded TV programs and other multimedia content from a DVR to a Personal Computer (PC). Additionally, such a system would provide a user with the ability to transfer recorded programs from a PC to another device in a secure manner that preserves the program material provider's copyrights.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow chart illustrating a method for establishing a secure connection between a DVR and a PC for the secure transfer and playback of multimedia content according to one embodiment of the invention;

DETAILED DESCRIPTION

Figure 1A:
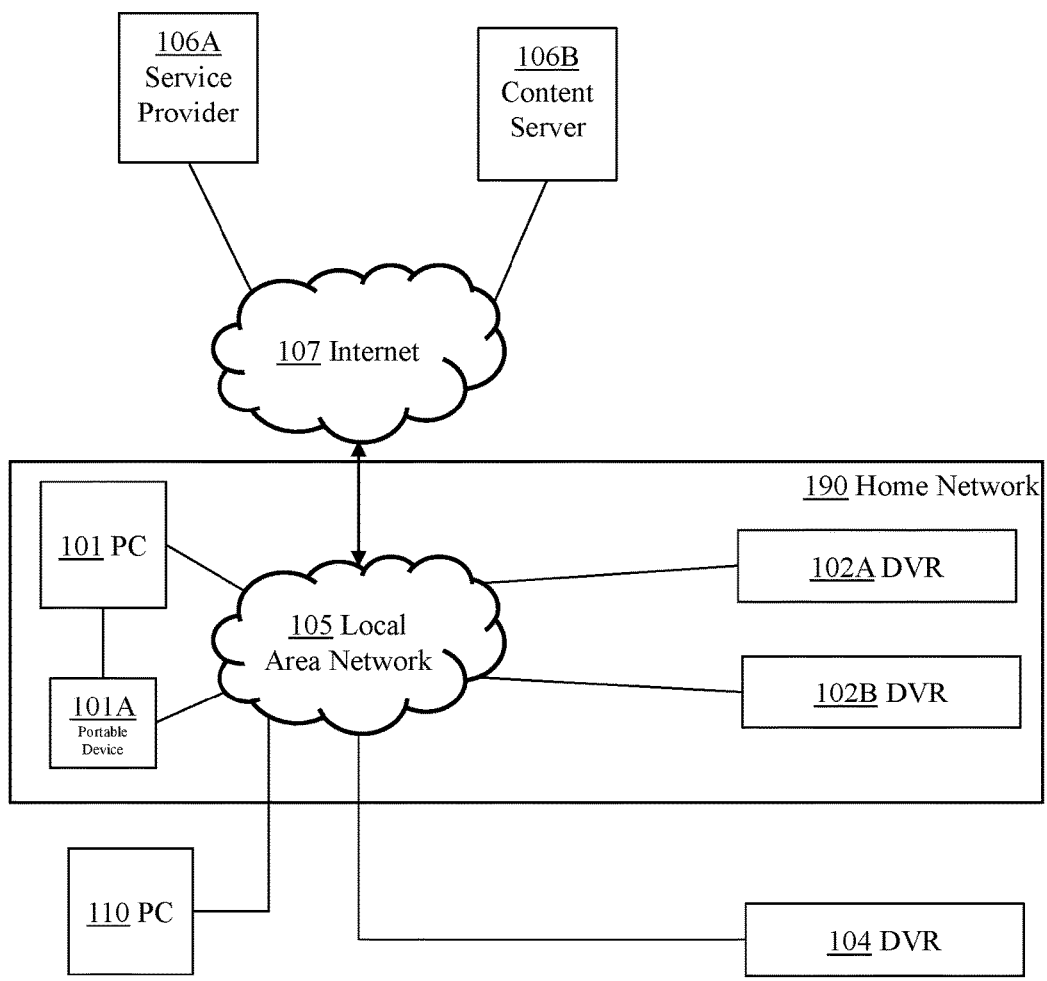
FIG. 1A is a block diagram illustrating a communication system for providing secure transfer and playback of multimedia content according to one embodiment of the invention.

A method and apparatus for providing secure transfer and playback of multimedia content is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

Embodiments are described herein according to the following outline:

1.0 General Overview
2.0 Structural Overview
3.0 Approach for Providing Secure Transfer and Playback of Multimedia Content
   3.1 Establishing a Secure Connection between a DVR and a PC
   3.2 Transferring Multimedia Content between a DVR and a PC
   3.3 Internal PES to MPEG Conversion
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for providing secure transfer and playback of multimedia content. DVR users are offered a means by which they may securely transfer content from a DVR to a PC and further to a handheld device. DVRs have the ability to identify PCs and other DVRS in a LAN by performing a discovery operation. During discovery, a DVR can determine which devices on the LAN are authorized to share and/or retrieve content from the DVR. On a PC on the LAN, a media application program is used to communicate with the DVR and initiate transfers of content from the DVR to the PC. When the media application program is loaded on the PC, it requests information for identifying a particular DVR from a user. In one embodiment, this information can be in the form of a media access key associated with the DVR. When the user supplies the media access key to the media application program, the program finds the associated DVR on the LAN and sends a connection request to the DVR.

When the DVR receives the connection request, it authenticates the request by, for instance, comparing the supplied media access key with the DVRs media access key. If the media access keys match, the DVR establishes a secure connection with the PC, which can be done by encrypting all messages between the DVR and PC using various encryption methods such as public key encryption or the Turing encryption algorithm. Further, the DVR can utilize hash algorithms, such as Message Digest-5 (MD5) or Secure Hash Algorithm-1 (SHA-1) to sign all messages between the DVR and PC. Thus, when the PC receives a message from the DVR, it uses an appropriate encryption key to decrypt the message into its original format.

Once the PC and the DVR have established a secure connection, the secure transferring of multimedia content between the devices is enabled. For this purpose, the media application program located on the PC features a graphical user interface for requesting and viewing a list of content located on the DVR and for selecting content for transfer. Thus, using the media application program, a user may request a listing of content from the DVR. When the request is received, the DVR generates the listing of content and sends the listing to the PC, which displays the available content to the user via the media application program. The user then selects which content to transfer from the DVR to the PC. The user can select any content that may be stored on the DVR, including, but not limited to: recorded TV programs, music files, movies, images, or content that the DVR downloaded from a content server using a broadband connection.

When the DVR receives the request to transfer the content, it locates the content and begins the process of preparing the content for transfer to the PC by converting the internal format of the content into a digital data stream. At this point, the DVR may attach additional data, such as content and licensing data to the digital data stream. In one embodiment, the DVR can further encrypt the digital data stream for secure delivery to the PC using, for example, using the Turing encryption algorithm. Also, the DVR can sign the digital data stream using a Secure Hash Algorithm-1 (SHA-1) of the DVR's MAC address to generate a SHA-1 encryption key. Next, the DVR sends the digital data stream to the PC, which decrypts and stores the digital data stream onto a storage device. While the DVR is sending the program stream to the PC, the media application program allows a user to track the progress of the transfer by displaying transfer status information. Further, once the PC receives the digital data stream, the PC may convert and send the data stream to a portable device.

In another embodiment, the PC can automatically retrieve content from the DVR without user interaction by having the user schedule transfers from the DVR to the PC. Further, the PC can automatically synchronize any content it receives with a portable device. A user can schedule the retrieval of content through a service provider website, which may be accessed via a PC or portable device. A broadband application of the system is also possible. In such an application of the system, a content server allows a DVR to select content to be transferred and viewed on the DVR over a broadband network, such as the Internet.

In other aspects, the invention encompasses a computer apparatus and a computer-readable medium configured to carry out the foregoing steps.

2.0 Structural Overview

Referring to FIG. 1A, in accordance with one embodiment, a communication system for sharing content between a DVR and a PC is shown. The communication system contains DVRs 102A, 102B and 104. DVRs 102A, 102B and 104 are communicatively coupled to Local Area Network (LAN) 105 through any proper communication interface, such as an Ethernet or wireless communications port. PC 101 may be a personal computing device such as a desktop or laptop computer, and is communicatively coupled to LAN 105 through any proper interface. Portable Device 101A may be communicatively coupled to the PC or to LAN 105. In one embodiment, the Portable Device 101A may be a handheld computing device, cellular phone, portable media player, etc., for displaying multimedia content. Through LAN 105 and Internet 107, DVRs 102A and 102B may communicate with Service Provider 106A and Content Server 106B.

Content Server 106B provides multimedia content to the DVR over a network connection. For instance, DVR 102A may download content from Content Server 106B for playback on a connected TV set or for transfer to PC 101 using the methods described herein.

In this example, PC 101, DVRs 102A and 102B and Portable device 101A are all authorized sharing devices on Home network 190. PC 110 and DVR 104 may be unauthorized sharing devices attached to LAN 105.

In one embodiment, DVR 102A, installed on home network 190, communicates with a Service Provider 106A, which provides program guide data, graphical resources (such as fonts, pictures, etc.), service information, software programs, advertisements, and other forms of data that enable DVR 102A to operate independently of the Service Provider 106 to satisfy viewer interests. Communication between DVR 102A and Service Provider 106 utilizes a secure distribution architecture to transfer data between the DVR 102A and the Service Provider 106A such that both the service data and the user's privacy are protected. The functionality of a DVR is typified in U.S. Pat. No. 6,233,389 which is owned by the Applicant and is hereby incorporated by reference.

Figure 1B:
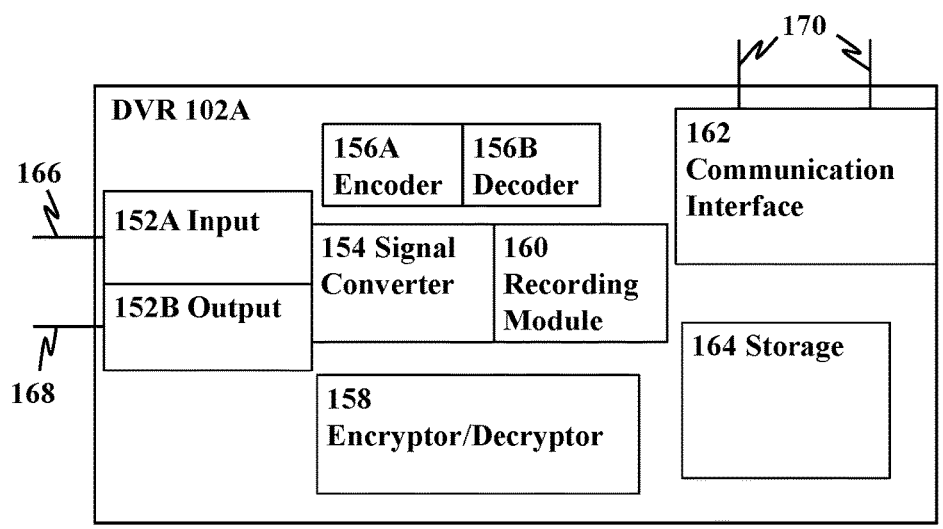
FIG. 1B is a block diagram illustrating a general overview of the components of a Digital Video Recorder (DVR) according to one embodiment of the invention.

Referring to FIG. 1B, in an embodiment, DVR 102A generally comprises a plurality of components, signified by Signal Converter 154, that are necessary to digitize an analog television signal and convert it into a digital data stream or to accept a digital data stream. DVR 102A receives 166 broadcast signals from an antenna, from a cable TV system, satellite receiver, etc., via Input 152A. Input 152A may comprise a plurality of tuning modules that allow a plurality of signals to be received and recorded simultaneously.

Recording Module 160 records the incoming data stream by storing the digital data stream on at least one storage facility, signified by Storage 164 that is designed to retain segments of the digital data stream. A Signal Converter 154 retrieves segments of the data stream, converts the data stream into an analog signal, and then modulates the signal onto a RF carrier, via Output 152B, through which the signal is delivered 168 to a standard TV set. Output 152B may alternatively deliver 168 a digital signal to a TV set or video monitor. For example, DVR 102A may utilize a Digital Visual Interface port (DVI) for sending digital signals to a TV via a DVI cable.

DVR 102A also includes a Communication Interface 162, through which the DVR 102A communicates 170 with Network 105 via Ethernet, wireless network, modem, or other communications standard. Further, DVR 102A may be integrated into a TV system such that the components described above are housed in a TV set capable of performing the functions of each component of DVR 102A.

In another embodiment, DVR 102A generally comprises a plurality of components necessary to receive, record, store, transfer and playback digital data signals from a plurality of sources, such as a PC, a DVR, a service provider, or content server. DVR 102A can transfer digital data signals to another DVR or PC. DVR 102A may encode or decode digital signals via Encoder 156A and Decoder 156B into a plurality of formats for playback, storage or transfer. DVR 102A can also encrypt or decrypt digital data signals using Encryptor/Decryptor 158 for storage, transfer or playback of the digital data signals.

The DVR 102A may be directly connected to the Service Provider 106A or Content Server 106B by using an internal telephone modem, signified by Communication Interface 162 to dial into an incoming call modem bank of Service Provider 106A. Alternatively, through Communication Interface 162, the DVR 102A may be indirectly connected to the Service Provider 106A or Content Server 106B via local area network (LAN) 105, which is in turn connected to Service Provider 106A and Content Server 106B through Internet 107. LAN 105 may be connected to Internet 107 using a cable modem or router such that multiple devices located on LAN 105 may connect to Internet 107.

The DVR 102A initiates a connection to LAN 105 by communicating with a LAN router to obtain a local IP address on home network 190. The DVR may also initiate a connection to Internet 107 by calling a local access telephone number for an Internet service provider (ISP) using an internal modem and telephone line. The ISP directs the network connection request to the Service Provider 106 for identification verification. Upon verification, the network connection is authorized and the DVR 102A is granted access to the Service Provider 106A.

On a user's PC 101, a media application program is specifically coded to communicate with one or more DVRs and is functional for encrypting and decrypting multimedia content. The media application program provides a user interface for viewing content on each sharing DVR and selecting content for retrieval. Further, the media application program may provide a graphical user interface for setting up a network of sharing PCs and DVRs on LAN 105.

3.0 Approach for Providing Secure Transfer and Playback of Multimedia Content 3.1 Establishing a Secure Connection Between a DVR and a PC Each DVR 102A, 102B goes through a discovery stage to find and establish a secure connection with other devices on the LAN. Discovery may be performed using any appropriate discovery protocol (e.g. Rendezvous by Apple Computer, Inc.), and may be set to run automatically at a specified time interval or at the user's request. During discovery, DVR 102A finds neighboring DVRs 102B, 104 and PCs 101, 110 on LAN 105 and may identify one or more devices as an authorized sharing devices. For instance, DVR 102A may identify DVR 102B as an authorized sharing device and also recognize DVR 104 as an unauthorized device. Therefore, any attempt by DVR 104 to request the content of DVR 102A will be denied. In order to determine which devices attached to LAN 105 are authorized sharing devices, DVR 102A may consult a digital sharing certificate provided by Service Provider 106A.

In order to supply DVR 102A with a digital sharing certificate, a user logs onto a Service Provider 106A website to create a record of the devices that he wants to be considered as authorized sharing devices. Using any appropriate user interface, the user enters the serial numbers or MAC addresses of the devices that he wants included, which the Service Provider 106 may verify through its database or by locating information the user has previously entered. Thereafter, Service Provider 106A creates a digital sharing certificate that identifies the user's authorized sharing devices. The certificate may contain each devices' serial number, MAC address, and corresponding public key. Alternatively, the certificate may contain any other unique information for identifying a DVR or PC.

The digital sharing certificate can inform a DVR that it can share its stored content with other DVRs that are listed in the digital sharing certificate and also retrieve content from those DVRs. It can also inform the DVR that the DVR can share its stored content with a PC once the PC confirms that it knows the DVR's private information, for example, its media access key or MAC address. The DVR can pair itself with a single PC (to provide a more secure environment) or it can pair itself with multiple PCs, depending on how the Service Provider 106A configures the DVRs.

The Service Provider 106A distributes the digital sharing certificate to the DVRs listed in the digital sharing certificate. The DVRs typically receive the digital sharing certificate when they perform their periodic contact with the Service Provider 106A for any updates to their electronic program guide or software updates. The Service Provider 106A may also push the digital sharing certificate to a DVR via the Internet 107 if the DVR is connected to the Internet 107.

In operation, if DVR 104 requests a list of multimedia content stored on DVR 102A from DVR 102A, DVR 102A checks its digital sharing certificate and finds that DVR 104 is not listed as an authorized sharing device. DVR 102A then rejects DVR 104's request for multimedia content.

The user may indicate that the particular DVR, e.g. DVR 102A, may share content over the local area network, or specifically, with the user's PC 101. Thereafter, when the DVR 102A next contacts the Service Provider 106A, the Service Provider will send a message to the DVR 102A causing it to enable sharing content over LAN 105. The DVR 102A may accept connections from any device that specifies a media access key that matches the DVR's media access key.

On PC 101, a media application program is specifically coded to communicate with any DVR 102A, 102B, 104 and is functional for encrypting and decrypting content. The media application program provides a user interface for viewing content on each sharing DVR 102A, 102B and selecting content for retrieval. Further, the media application program may provide an interface for setting up a network of sharing PCs and DVRs on the user's LAN. Using such an interface, a user may identify any PC or DVR located on home network 109 and select particular PCs or DVRs as authorized sharing devices. Another function of the media application program is to encode or transcode multimedia content for transfer to Portable Device 101A.

When PC 101 loads its media application program, the program performs a discovery, using Rendezvous for example, of neighboring DVRs 102A, 102B and 104 on LAN 105. During the discovery, the PC may identify one or more authorized sharing DVRs 102A, 102B. In other embodiments of the invention, a user may supply the media application program with information identifying a particular DVR as an authorized sharing DVR on LAN 105. Such identifying information may be a media access key, serial number, or any other unique identification of a DVR. Thus, when the PC performs the discovery, the PC may search for only those DVRs specified as authorized sharing DVRs 102A, 102B.

In other embodiments, when PC 101 loads the media application program, the media application program may request user information for authorizing the user of PC 101. For instance, media application program may request a user ID and password supplied by Service Provider 106A for accessing the media application program or originally setup by the user when the user initialized the media application program. When the user enters his information, the media application program compares the supplied information with the information saved by the media application program to determine if the user is authorized to use the program.

Further, the media application program may request a media access key associated with a DVR 102A on LAN 105 when the user attempts to pair the media application program with the DVR 102A. In one embodiment, each DVR 102A, 102B and 104 is associated with a unique media access key used for accessing content stored on the DVR. The media access key may be accessible through the user interface of the DVR. In other embodiments, the media access key for DVR 102A may be provided by Service Provider 106A to the user. For instance, a user accesses the website of Service Provider 106A and obtains the media access key for DVR 102A by supplying a username and password to the Service Provider 106A.

FIG. 2 is a flowchart showing a process for establishing a secure connection between DVR 102A and PC 101 according to one embodiment. At step 202, PC 101 loads the media application program. If it is determined that this is the first time the media application is loaded on PC 101 the media application program requests a media access key from the user using the display of PC 101 in order for the media application program to retrieve a list of stored content from a DVR. Further, the media application program may request a media access key from the user if it is determined that the user is adding a new DVR 102B to his list of sharing DVRs for that particular media application program.

At step 206 when the user supplies the media access key to the media application program, the media application program locates the DVR 102A associated with the supplied media access key on the LAN 105. Once the selected DVR 102A has been located, the media application program causes PC 101 to send a connection request to DVR 102A. PC 101 sends the connection request along with the supplied media access key for authentication. In other embodiments, PC 101 may use any other acceptable form of authentication.

At step 203, before receiving the connection request, DVR 102A will have determined whether it is authorized to share content over LAN 105. For instance, DVR 102A may determine it is authorized to share content over LAN 105 after receiving an authorization notification in a digital sharing certificate, for example, from Service Provider 106A. If DVR 102A determines that it is not authorized to share content over LAN 105, DVR 102A will refuse all incoming connections.

Otherwise, at step 209, DVR 102A is authorized to share its multimedia content and receives the connection request from PC 101. In one embodiment, the DVR receives a notification from the Service Provider 106A indicating that the DVR 102A may pair with any PC that correctly indicates the DVR's media access key. In another embodiment, the DVR may require additional parameters, such that the DVR requires that PC 101 also be located within the DVR's local area network.

Next, at step 211, DVR 102A authenticates the connection request by comparing the media access key supplied by PC 101 with the DVR's own media access key. If the keys match, then DVR 102A may establish a secure connection by sending an acknowledgment to the PC 101.

Additionally, to establish the secure connection, DVR 102A can specify a public encryption key for encrypting all messages between the DVR and the PC. Thus, when PC 101 receives the acknowledgment from DVR 102A, the PC will have DVR 102A's public encryption key and can send secure messages to DVR 102A using the key. Further, PC 101 may also send its own public encryption key to DVR 102A so that DVR 102A can send secure messages to PC 101. Thus, a secure connection is established between DVR 102A and PC 101. Alternatively, the secure connection may be established using any available encryption algorithm, for instance, the Turing encryption algorithm. Also, the secure connection may be established using an encryption key system. In such a system, messages may be signed with encryption keys that are generated using the Message Digest 5 (MD5) algorithm or Secure Hash Algorithm-1 (SHA-1) of a device's MAC address. The generated encryption key is then used by DVR 102A or PC 101 to decrypt signed messages into their original format.

Initially, the media application program may be configured to be paired with one DVR using the media access key associated with that DVR. In another embodiment, the media application program may be configured to communicate with more than one DVR on LAN 105. The media application program may provide the ability to enter a plurality of media access keys corresponding to a plurality of DVRs on LAN 105. In this example, the media application program may allow PC 101 to establish a secure connection with both DVR 102A and DVR 102B.

Alternatively, after establishing a secure connection with one DVR, the media application program may identify all authorized sharing DVRs on the users LAN. For instance, in one embodiment, when the PC establishes a secure connection with the first DVR, the first DVR supplies the PC with a sharing certificate. This sharing certificate may have been provided by the Service Provider 106A, or alternatively another DVR. The sharing certificate identifies all DVRs on the user's LAN that are authorized to share content, and may also contain each DVR's media access key. In one embodiment, the Service Provider 106A sends a sharing certificate to the PC after the user has selected authorized sharing DVRs on the website of Service Provider 106A. Thus, Service Provider 106A creates the sharing certificate and transfers it to PC 101 through Internet 107. In another embodiment, the PC media application program may retrieve the sharing certificate from the initially paired DVR 102A.

3.2 Transferring Multimedia Content Between a DVR and a PC

Once PC 101 and DVR 102A have established a connection, the secure transferring of multimedia content between the devices is enabled. Secure transfer of content may be established from the DVR 102A to the PC 101 or from the PC 101 to the DVR 102A.

Figure 3A:
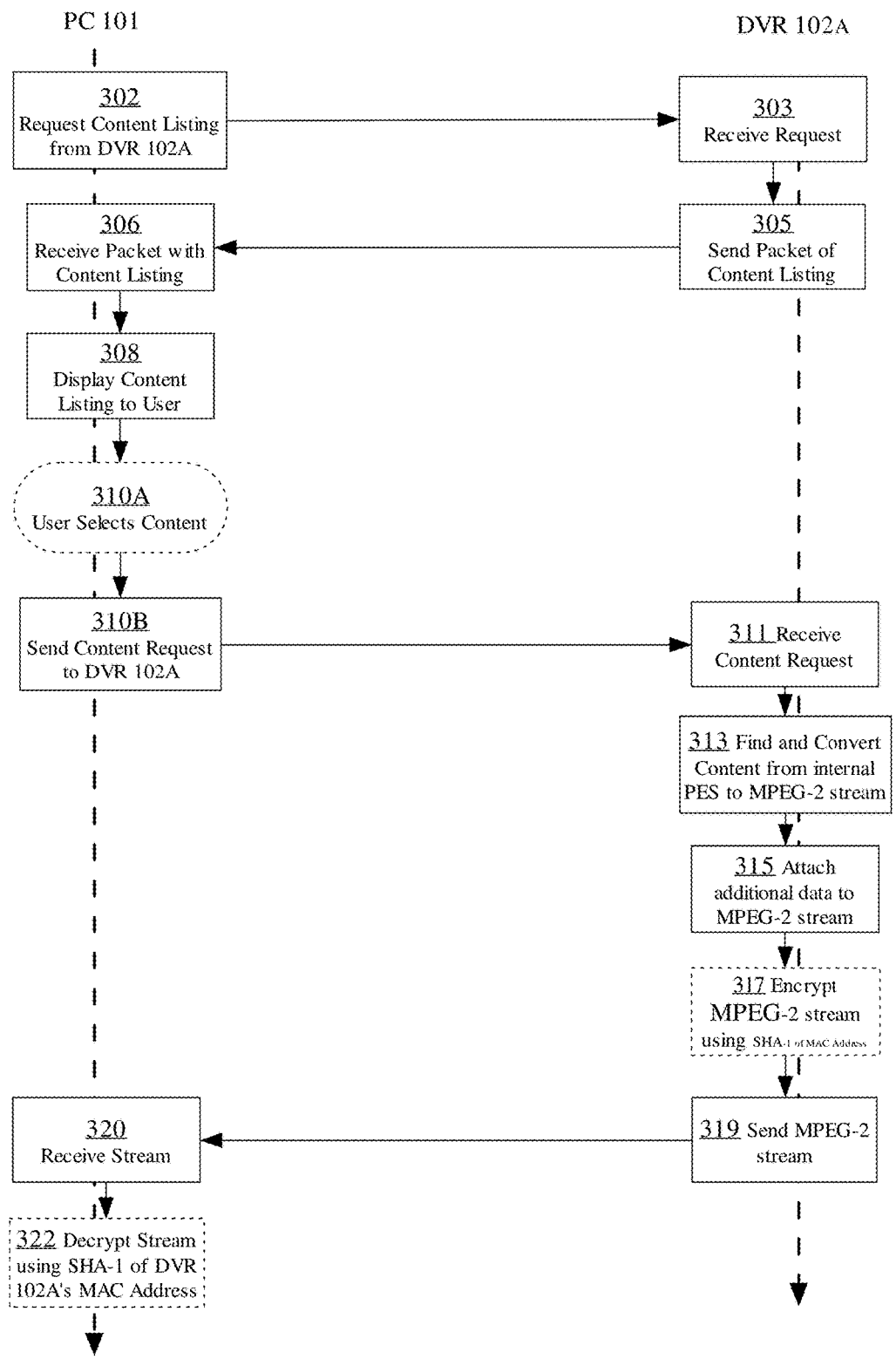
FIG. 3A is a flow chart illustrating a method for securely transferring multimedia content between a DVR and a PC according to one embodiment of the invention.

Referring to FIG. 3, at step 302, once a connection has been established, a user utilizing the media application program on PC 101 may request that the contents of DVR 102A be displayed to the user. Alternatively, media application program may automatically generate a request for content and send it to the DVR 102A every time the media application program is loaded on PC 101. Next, at step 303 when the DVR 102A receives the request for content, it generates data listing the multimedia content stored on DVR 102A and sends a packet to the PC 101 including metadata containing a listing of available content on the DVR 102A. At step 306, when the media application program receives the packet, it displays the available content to the user via the user interface at step 308.

Figure 3B:
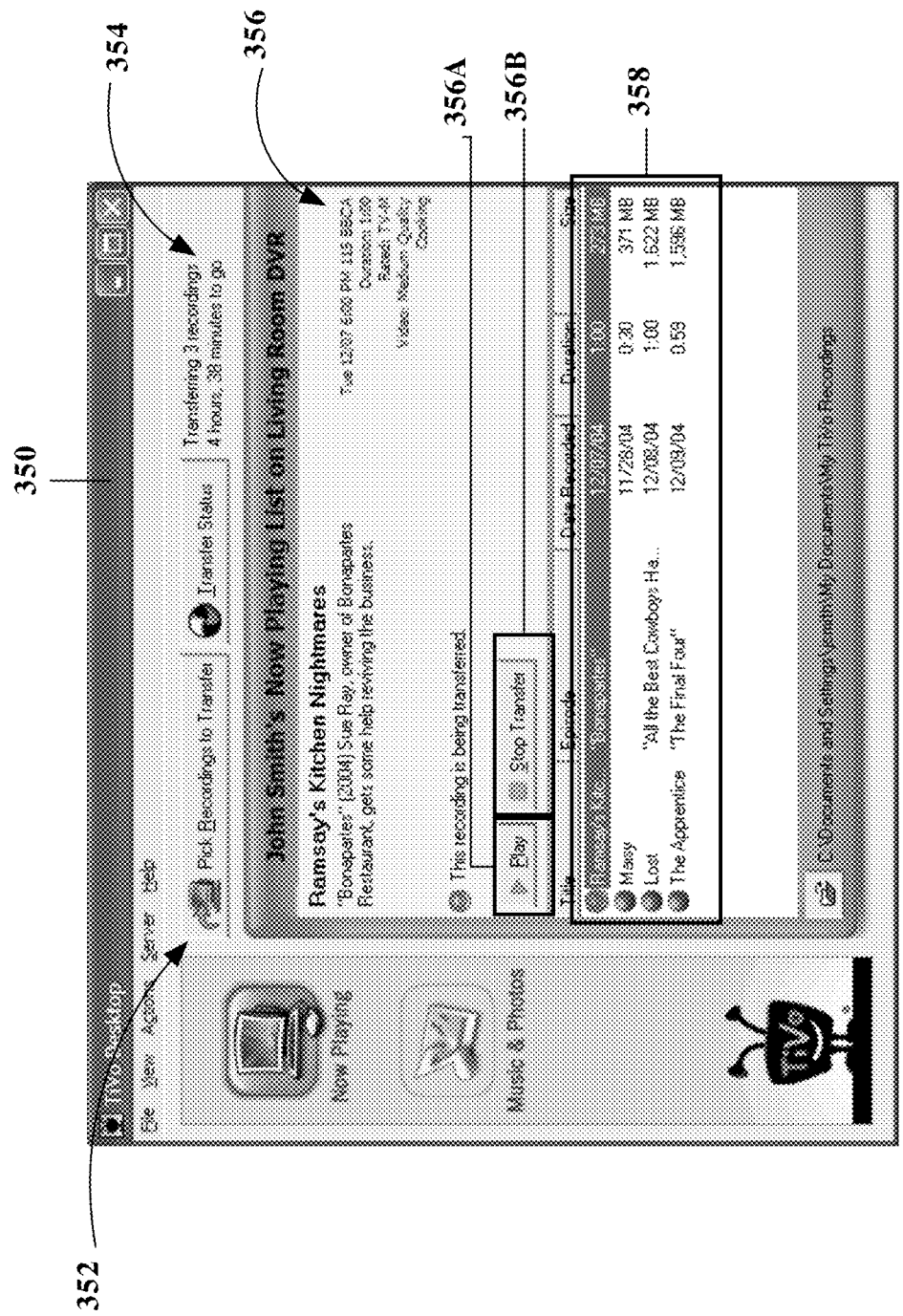
FIG. 3B is a block diagram illustrating a user-interface for securely transferring multimedia content between a DVR and a PC according to one embodiment of the invention.

Referring to FIG. 3B, according to one embodiment, a user interface of the media application program is depicted. In program window 350, the media application program presents a user with a list of content 358 stored on DVR 102A. A user can select a particular program from the list of content 358 and, by selecting button 352, cause the media application program to generate a request to transfer the selected program from DVR 102A to PC 101. Media application program in turn sends this request to DVR 102A to initiate the transfer.

Once a transfer has been initiated, program window 350 allows a user to track the progress of the transfer by displaying transfer status information 354. The transfer status information 354 may include the amount of multimedia content being transferred, as well as the time remaining to complete the transfer. Using the content list 358, a user can select particular multimedia content and view detailed information of the particular multimedia content in information window 356. Information window 356 may contain information pertinent to the multimedia content, including the title, description, duration and rating of the particular multimedia content. Further, information window 356 may contain control buttons 356A and 356B. For instance, Play button 356A allows a user to play the selected multimedia content on the user's PC 101 and Stop transfer button 36B allows a user to stop the transfer of multimedia content from DVR 102A to PC 101.

Referring back to FIG. 3A, at step 310A, using the media application program, the user may select multimedia from the list of available content 358 on DVR 102A. The requested multimedia content may be a full motion video program, audio content, picture content, or any other content that may be stored on the DVR 102A. At 310B, the media application program then sends the request from PC 101 to DVR 102A. The DVR 102A, at step 311, receives the request and locates the content, which may be stored in the DVR's memory or other storage mechanism accessible by the DVR 102A. Once the DVR 102A has located the requested multimedia content, the DVR 102A begins the process of preparing the content for transfer to PC 101.

In order for the PC to properly read and interpret the multimedia content, the DVR 102A may convert its internal representation of the multimedia content into a program stream readable by the computer. In one embodiment, the internal representation of the multimedia content is an internal Packetized Elementary Stream (PES) format not readable by a PC. Details of the internal PES format are typified by U.S. Pat. No. 6,233,389 B1, which is owned by the Applicant and is incorporated by reference herein. Also, one program stream format readable by a computer is the Motion Picture Experts Group (MPEG) format, of which MPEG-2 and MPEG-4 are the typical popularly used formats. Alternatively, other digital formats may be used.

Figure 5:
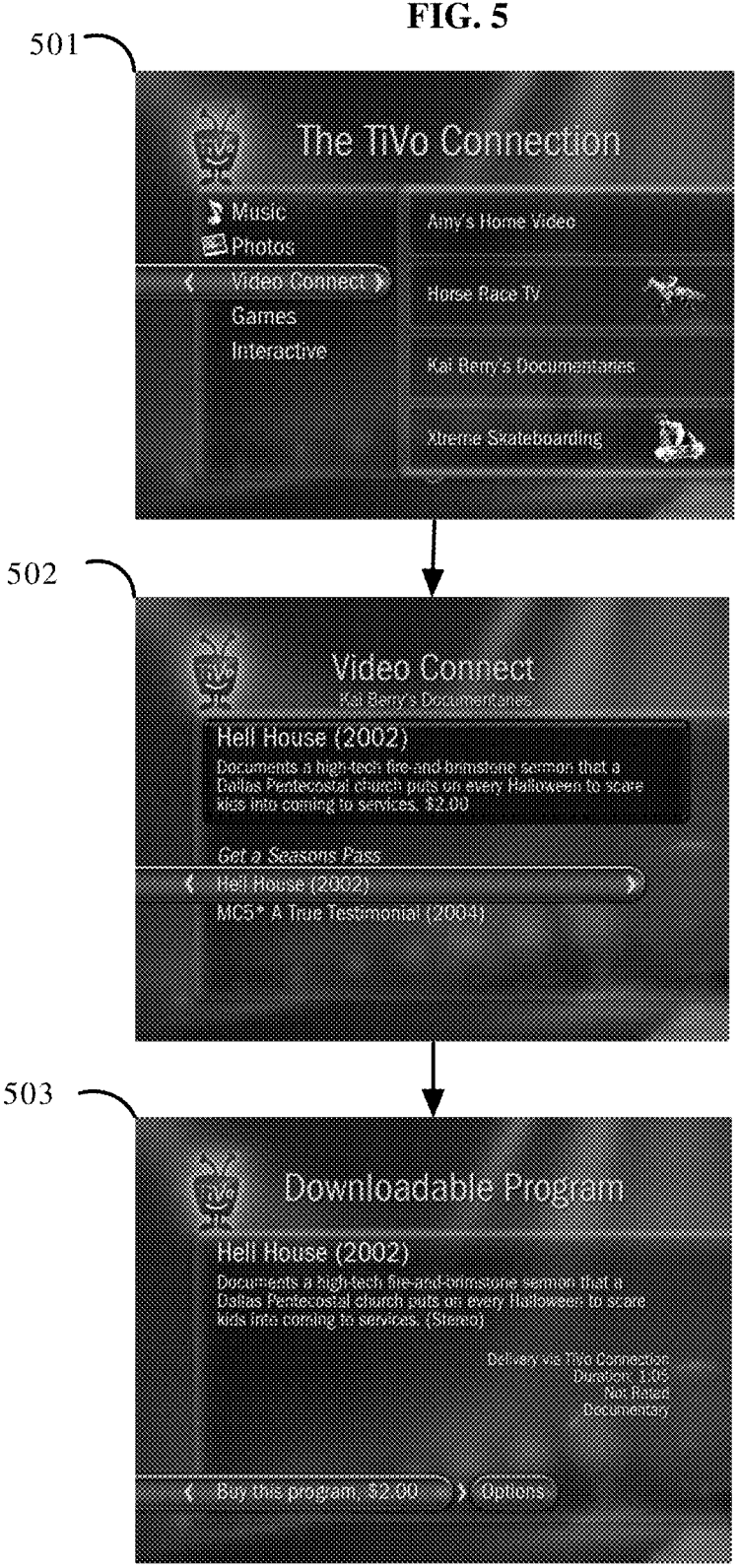
FIG. 5 is a block diagram illustrating a user-interface presented to a user of a DVR for downloading multimedia content from a content provider according to one embodiment of the invention.

Thus, at step 313, DVR 102A converts the internal PES format of the requested multimedia content into an MPEG program stream. In other embodiments, DVR 102A may convert the internal PES format into any format readable by PC 101. Alternatively, the conversion from internal PES into an MPEG program stream may take place at the PC. Thus, DVR 102A sends its internal PES format to PC 101, including any additional data as further described. For purposes of providing an example, the process of converting the internal PES format into an MPEG program stream is illustrated at FIG. 5 and discussed below in Section E.

After conversion, at step 315, DVR 102A may attach additional data to the MPEG program stream. In the case that the conversion takes place at the PC, DVR 102A may attach additional data to the internal PES format of the multimedia content before sending it to PC 101. The additional data in either event may be, for instance, content data comprising information of the requested multimedia content. Further, in other embodiments, DVR 102A may attach additional data such as licensing data. The licensing data may contain information relating to the user's ability to store and play the multimedia content. For example, the user may be limited to storing the content on the PC for three days.

Figure 4:
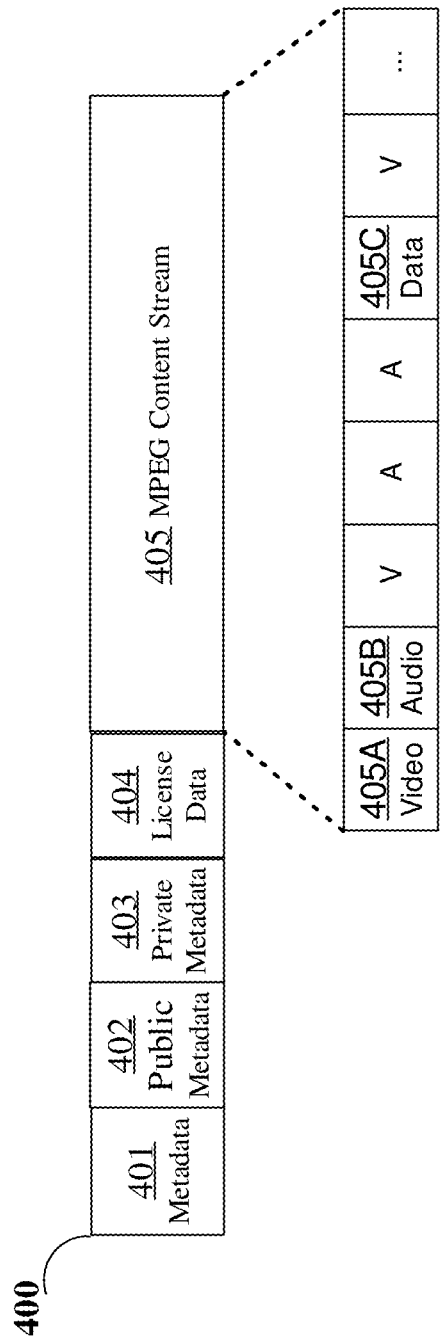
FIG. 4 is a block diagram illustrating a general overview of an MPEG program stream according to one embodiment of the invention.

FIG. 4 is a general overview of an MPEG content stream 400 according to one embodiment. The MPEG content stream 405 contains the data representing the requested multimedia content. MPEG content stream 405 is made up of interleaved Video 405A, Audio 405B and Data packets in a format readable by PC 101. Additional Data 401-404 may be attached to MPEG content stream 405 for transfer to PC 101.

In one embodiment the additional data may comprise Metadata 401, Public Metadata 402, Private Metadata 403 and License Data 404. For example, Metadata 401 and Public Metadata 402 may contain information on the content itself, such as the content name, duration, commercials that may be played and other content notes. Private Metadata 403 may contain other information such as customer information for pay-per-view movies, customer billing information, customer preferences, etc. License data 404 may contain information regarding user license restrictions, including playback restrictions or storage restrictions.

Alternatively, the licensing data may indicate an expiration date or time for the content, such that once the indicated expiration date or time has passed, media application program running on PC 101 will delete or erase the transferred content from the PC's storage device. Alternatively, the passage of such an expiration date could cause media application program to display a message to the user indicating the expiration of the multimedia content. Further, the licensing data may indicate the amount of times multimedia content may be viewed, such that PC 101 will delete the content from the PC's storage once the user has exceeded the viewing limit.

In another embodiment, the additional data may comprise DVR origin data. For instance, the MPEG content stream 405 may comprise information such as a DVR 102A's serial number or MAC address. Further, the DVR origin data may include a signature using a private key of DVR 102A.

In another embodiment, the DVR may also add a unique watermark to the data in the program stream. For instance, DVR 102A may modify program stream 400 by inserting data representing DVR 102A's serial number. In the case of video or photo content, the watermark may be visible, such that when the multimedia content is played back, the originating DVR's information is displayed on screen in an un-obtrusive manner. Alternatively, the watermark may be invisible or imperceptible to the user such that the watermark data is hidden in the program stream but nonetheless available for verification.

Referring back to FIG. 3, after DVR 102A has attached the additional data to the program stream 400, at step 317, DVR 102A may encrypt the program stream for secure delivery to PC 101 in the same manner as described above for messages between the DVR and PC. DVR 102A may decide to encrypt the entire program stream 400, or alternatively, only particular portions of program stream 400, such as the MPEG content stream 405 and private metadata 403.

At step 319, DVR 102A sends the program stream to PC 101. When PC 101 receives the program stream, at step 322, it decrypts the program stream 400 as described above. Alternatively, if DVR 102A used a different encryption algorithm, PC 101 would use the respective algorithm for decrypting the program stream 400. After PC 101 has decrypted the program stream, PC 101 may store the program stream onto the PC's local or removable storage device.

Alternatively, in another embodiment, when PC 101 receives the encrypted program stream from DVR 102A, PC 101 may store the encrypted program stream directly onto the PC's local or removable storage device without going through the decryption process. Thereafter, PC 101 retrieves and decrypts the encrypted program stream using the appropriate decryption key during playback of the multimedia content. Thus, when a user requests to play back the multimedia content the program stream is retrieved from the storage device, decrypted, and displayed to the user.

During playback, PC 101 may utilize additional data 401-404 of program stream 400 to display content information or perform a license check to authorize the playback of the content. Also, once the program stream has been decrypted and stored, PC 101 may transfer the multimedia content to another device, such as portable device 101A. Transfer to the portable device 101A may be accomplished through any means. For instance, the media application program may provide an option for synchronizing the multimedia content stored on PC 101 with portable device 101A. Synchronization may occur over LAN 105, or directly through a serial cable or wireless interface. Further, for correct playback on portable device 101A, PC 101 may further transcode a stored program stream by converting it into a format readable by portable device 101A.

In another embodiment, PC 101 may have stored multimedia content that a user would like to access using his DVR 102A. After PC 101 and DVR 102A have established a secure connection, as described above, DVR 102A can request multimedia content from PC 101. Using a graphical interface on DVR 102A, a user can select multimedia content for retrieval from PC 101. The multimedia content on the PC may be content downloaded from Content Server 106B, content from another DVR 102B, or multimedia content already owned by the user and stored on PC 101. Further, the multimedia content may be content supplied by portable device 101A. In one embodiment, portable device 101A is a video-enabled phone with the ability to record, store and playback video content. As such, portable device 101A may transfer stored video programs to PC 101, which in turn transfers the video program to DVR 102A. In other embodiments, portable device 101A may be any device capable of transferring multimedia content to PC 101.

In order to transfer the content from the PC 101 to the DVR 102A, the above process of transferring content from the DVR to the PC is reversed. However, instead of converting the program stream, PC 101 merely encrypts the MPEG program stream and sends it to DVR 102A. When DVR 102A receives the MPEG program stream, it decrypts the stream and converts it into an internal PES format, for example, by reversing the above PES-MPEG conversion process. Alternatively, the DVR may store the MPEG program stream onto its storage device without conversion or decryption.

In yet another embodiment, a user may automate the above process by having PC 101 automatically retrieve content from DVR 102A. For instance, using the media application program on PC 101, a user can schedule the retrieval of multimedia content from DVR 102A by setting a pre-determined time for retrieving content. When the time for retrieval occurs, the media application program automatically requests the content from DVR 102A. In conjunction with scheduling a time for retrieving content, a user can also specify the particular multimedia content to retrieve. Thus, the media application program may be programmed to retrieve all of the user-specified recorded content on DVR 102A once a week, effectively synchronizing the content on the PC 101 with that on the DVR 102A. Alternatively, the user may request that only particular multimedia content be automatically retrieved from DVR 102A. In one example, the particular multimedia content may be a particular TV program or a series of a particular TV program.

In the event the user would like to schedule the retrieval of multimedia content not yet recorded by the DVR, the media application program is functional for causing DVR 102A to record a particular program and subsequently transfer the recorded content to PC 101. The media application program on PC 101 is also functional for determining whether particular multimedia content has been recorded and stored on DVR 102A. For example, the media application program can periodically request a listing of recorded content stored on DVR 102A to determine whether particular multimedia content has been stored. If the multimedia content is not listed as being stored in DVR 102A, the media application program will not initiate a transfer of the content from DVR 102A to PC 101. Further, the media application program can verify that the particular multimedia content is scheduled for recording, and if not, can instruct DVR 102A to record the content at an appropriate time (e.g., using information retrieved from an electronic program guide). Once the media application program determines that the particular multimedia content has been stored on DVR 102A, the media application program initiates a transfer of the content between DVR 102A and PC 101 using the process for transferring content described above.

Alternatively, a user may schedule the retrieval of content through Service Provider 106A. For instance, a user may access the website of Service Provider 106A to indicate particular multimedia content the user would like transferred from DVR 102A to PC 101. The user can indicate that the multimedia content be transferred at a scheduled time or automatically once the content has been recorded and stored by DVR 102A. Next, Service Provider 106A sends a message to PC 101 instructing PC 101 to request and retrieve multimedia content from DVR 102A using the user's settings.

Alternatively, the Service Provider 106A can instruct the PC 101 to retrieve other multimedia content from the DVR 102A that the user has not requested. For example, the Service Provider 106A can instruct the PC 101 to retrieve a series of video commercials that the Service Provider 106A wants the user to view on the PC 101. The Service Provider 106A has the ability to push content to the PC 101 via the DVR 102A. This enables the Service Provider 106A to implement a fee based service where advertisers and content providers pay the Service Provider 106A a fee to have their content pushed to the user's PC 101. The fee can be based on simply placing the content on the PC 101, the actual user viewing the content on the PC where the advertiser or content provider's fee is based on the actual viewing of the content by the user, or a combination of both. The media application program has the ability to report to the Service Provider 106A what content has been viewed, how many times the content has been viewed, and how much of each content has been viewed, as well as other user viewing statistics that can be measured.

Thus, a user does not need to use the media application program on PC 101 to initiate a transfer. Instead, the user need only indicate what particular content the user would like transferred from DVR 102A to PC 101. Also, if the user requests to transfer multimedia content that is not yet stored or recorded on DVR 102A, Service Provider 106A may not instruct PC 101 to retrieve the multimedia content until Service Provider 106A determines that the multimedia content is available on DVR 102A.

In one embodiment, Service Provider 106A can determine that multimedia content is available on DVR 102A by connecting directly to DVR 102A through Internet 107. Alternatively, Service Provider 106A can make this determination by establishing a connection to DVR 102A over a telephone line. The DVR 102A can initiate the contact or the Service Provider 106A can do so. Service Provider 106A maintains a database containing information of DVR 102A's recorded multimedia content and scheduled recordings. Every time Service Provider 106A connects to DVR 102A, Service Provider 106A updates its database to correctly reflect DVR 102A's recorded content and scheduled recordings. Thus, Service Provider 106A checks the database to determine if DVR 102A contains recorded content or has scheduled a particular recording.

Once Service Provider 106A determines that DVR 102A has recorded the particular multimedia content, Service Provider 106A sends a message to PC 101 to initiate the transfer of the multimedia content from DVR 102A to PC 101. Alternatively, Service Provider 106A may simply send the request to PC 101 to transfer multimedia content from DVR 102A to PC 101, after which the media application program on PC 101 is used to determine whether DVR 102A contains the recorded content, or whether the content should be scheduled for recording and/or retrieval. Further, in another embodiment, the above process may be used to initiate a transfer from DVR 102A to portable device 101A. Thus, Service Provider 106A can send a message to PC 101 to initiate a transfer from DVR 102A to PC 101, and further to transcode the multimedia content into a format readable by portable device 101A and transfer the multimedia content to portable device 101A.

Additionally, the process described above may be initiated by portable device 101A. In such an embodiment, portable device 101A may be used to access Service Provider 106A's website. Thus, portable device 101A may be functional for selecting and scheduling the transfer of multimedia content from DVR 102A to PC 101. Further, in one embodiment, Service Provider 106A can determine when the transfer of the multimedia content from DVR 102A to PC 101 is complete. For instance, once the transfer is complete, DVR 102A or PC 101 may send a message to Service Provider 106A through Internet 107. Subsequently, Service Provider 106A can send a message to portable device 101A through Internet 107 indicating the completion of the transfer. Further, in another embodiment, portable device 101A may be a cellular phone, and Service Provider 106A can request that a cellular network operator send a notification message to the cellular phone using the cellular network.

A broadband application of the system is also possible. In such an application of the system, a content server allows a DVR 102A to select content to be transferred and viewed on DVR 102A over a broadband network, such as Internet 107. For example, DVR 102A may download content from Content Server 106B for playback or storage on DVR 102A via Internet 107.

Referring to FIG. 5, according to one embodiment, a user interface for downloading content over a broadband network is shown. Through a standard TV set connected to DVR 102A, DVR 102A causes screen 501 to be presented to a user of DVR 102A. Screen 501 contains selectable options, one of which is the "Video Connect" option for obtaining multimedia content over a broadband connection. A user of DVR 102A can select options displayed on Screen 501 by utilizing any appropriate control interface, such as a remote control associated with DVR 102A. When a user of DVR 102A selects the "Video Connect" option, DVR 102A causes screen 502 to be presented.

Screen 502 displays information regarding multimedia content available for download. In one embodiment, such information may be the title, duration, and description of the multimedia content. When the user selects the particular multimedia content, DVR 102A causes screen 503 to be presented to the user.

Screen 503 includes an option for purchasing and initiating a download of the multimedia content from Content Server 106B. Once the user selects to purchase and download the multimedia content, DVR 102A sends a request to Content Server 106B to initiate a transfer of the multimedia content to DVR 102A. In other embodiments, the user may download the multimedia content without purchasing the multimedia content from the Content Server 106B. For instance, the user may have previously paid for the multimedia content or the multimedia content may be free of charge.

To ensure the secure transfer of such content between Content Server 106B and DVR 102A over Internet 107, the multimedia content may be encrypted by Content Server 106B using the public encryption key of DVR 102A. The public encryption key of DVR 102A may be provided to Content Server 106B from DVR 102A or Service Provider 106A. Once DVR 102A receives the encrypted multimedia content, it can decrypt and store the content for playback. In another embodiment, the multimedia content downloaded from Content Server 106B may be subsequently transferred to PC 101 or another DVR 102B using the process described above.

A system for providing secure transfer and playback of multimedia content comprises, according to an embodiment, a digital video recorder, a personal computer, a service provider, and a computer network coupled to the service provider, PC and DVR. The service provider communicates with the DVR to obtain a listing of multimedia content stored on the DVR. The service provider provides the listing of multimedia content to a user of the service provider. The DVR is instructed by the service provider to transfer specific multimedia content to the PC that is selected by a user according to the listing of multimedia content provided by the service provider. In an embodiment, the service provider communicates with the DVR to obtain a recording schedule of the DVR. The DVR is then instructed by the service provider to record multimedia programs that are selected by the user.

3.3 Internal PES to MPEG-2 Conversion Process

Figure 6:
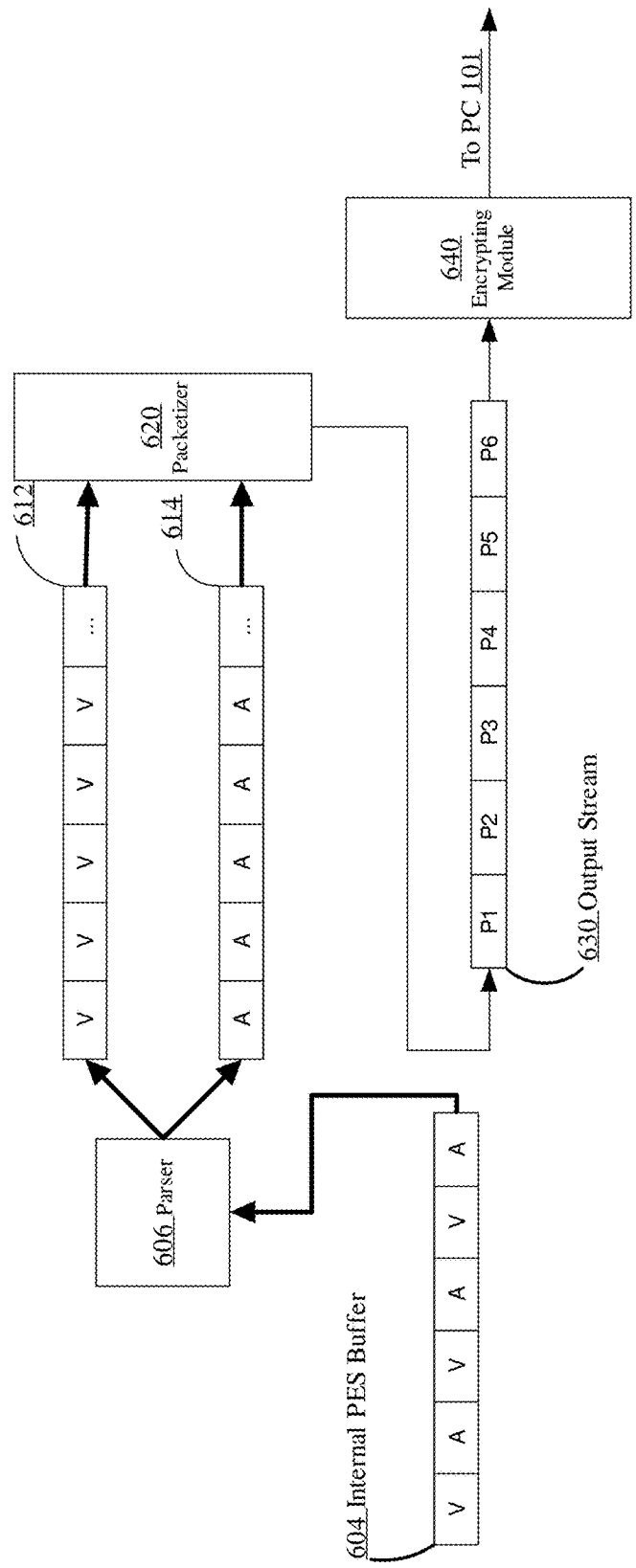
FIG. 6 is a diagram illustrating a process for converting an internal PES representation of multimedia content into an MPEG program stream according to one embodiment of the invention.

In one embodiment, DVR 102A stores recorded multimedia content in an internal PES format for playback. However, in order for PC 101 to process the multimedia content, the internal PES format must be converted into a PC readable form. In one embodiment, such a PC readable format is an MPEG program stream. Referring to FIG. 6, the internal PES representation of the multimedia content is embodied by PES Buffer 604, which contains video events (V) and audio events (A) of the multimedia content. Additionally, in other embodiments, PES Buffer 604 may contain other events such as private data events. To begin the process of converting the data in internal PES buffer 604 to an MPEG program stream 400, DVR 102A allocates an audio buffer 612 and video buffer 614.

Parser 606 reads each event in the PES buffer and places the audio or video data in the respective buffer 612 or 614. Thus, video events (V) will be parsed into the video buffer 612 and audio events (A) will be parsed into audio buffer 614.

Video buffer 612 and audio buffer 614 are monitored by packetizer 620. When a predetermined amount of video or audio data has filled each buffer, packetizer 620 begins creating packets for transfer of the multimedia content in a packet-switched network. In one embodiment, a packet contains a header portion and a data portion. The packetizer 620 creates packets by taking video or audio data from the respective buffer and placing it in the data portion of each packet. For example, packetizer 606 may create a packet for every 5 kilobytes of data in video buffer 612. Assume, for instance, that each video event (V) in video buffer 612 represents 1 KB. When five video events (V) have entered video buffer 612, packetizer 606 determines that enough data (5 KB) has filled the video buffer 612, and inserts the data representing the five video events (V) into the data portion of packet.

Further, in another embodiment, packetizer 620 is functional for placing additional data in the header portion of each packet. For instance, packetizer 620 may insert header data into the packet indicating that the audio and video data have been encoded using the MPEG standard. When the packetizer has completed creating a packet P1, it places the packet into output stream 630. In one embodiment, the packets P1-P5 in output stream 630 are fed to an encrypting module 640 for the encryption of each packet using an appropriate encryption algorithm. Alternatively, encrypting module 640 may be used to sign messages using an encryption key generated using SHA-1 with the DVR's MAC address or media access key. Finally, each packet in output stream 630 is sent to PC 101. Unlike the internal PES representation of the multimedia content, the resulting output stream 630 is a format that is readable by PC 101.

In another embodiment, instead of using an internal PES format, DVR 102A may store multimedia content as an MPEG program stream. In one embodiment, the MPEG program stream is an MPEG-2 or MPEG-4 program stream. Thus, DVR 102A will not need to convert the data stream for transfer to PC 101. For instance, when DVR 102A initiates a transfer of the multimedia content to PC 101, DVR 102A retrieves the MPEG program stream from storage, parses the data stream into data packets and sends the packets to PC 101. As mentioned before, DVR 102A may also encrypt the data sent to PC 101. When PC 101 receives each packet, it re-assembles the packets into the MPEG program stream and stores the data stream onto a storage device. When the user decides to play back the multimedia content, PC 101 retrieves the MPEG program stream from storage, decrypts the data stream and displays the multimedia content to the user. Further, PC 101 may transcode the MPEG program stream for transfer to portable device 101A. In another embodiment, PC 101 may send the MPEG program stream directly to portable device 101A without any further processing. For instance, portable device 101A may be functional for storing and playing back multimedia content in MPEG format.

Alternatively, DVR 102A may store multimedia content in any format acceptable for storage and/or playback on DVR 102A. Further, DVR 102A or PC 101 may convert the multimedia content to any format acceptable for storage and/or playback on PC 101 or portable device 101A.

4.0 Implementation Mechanisms—Hardware Overview

Figure 7:
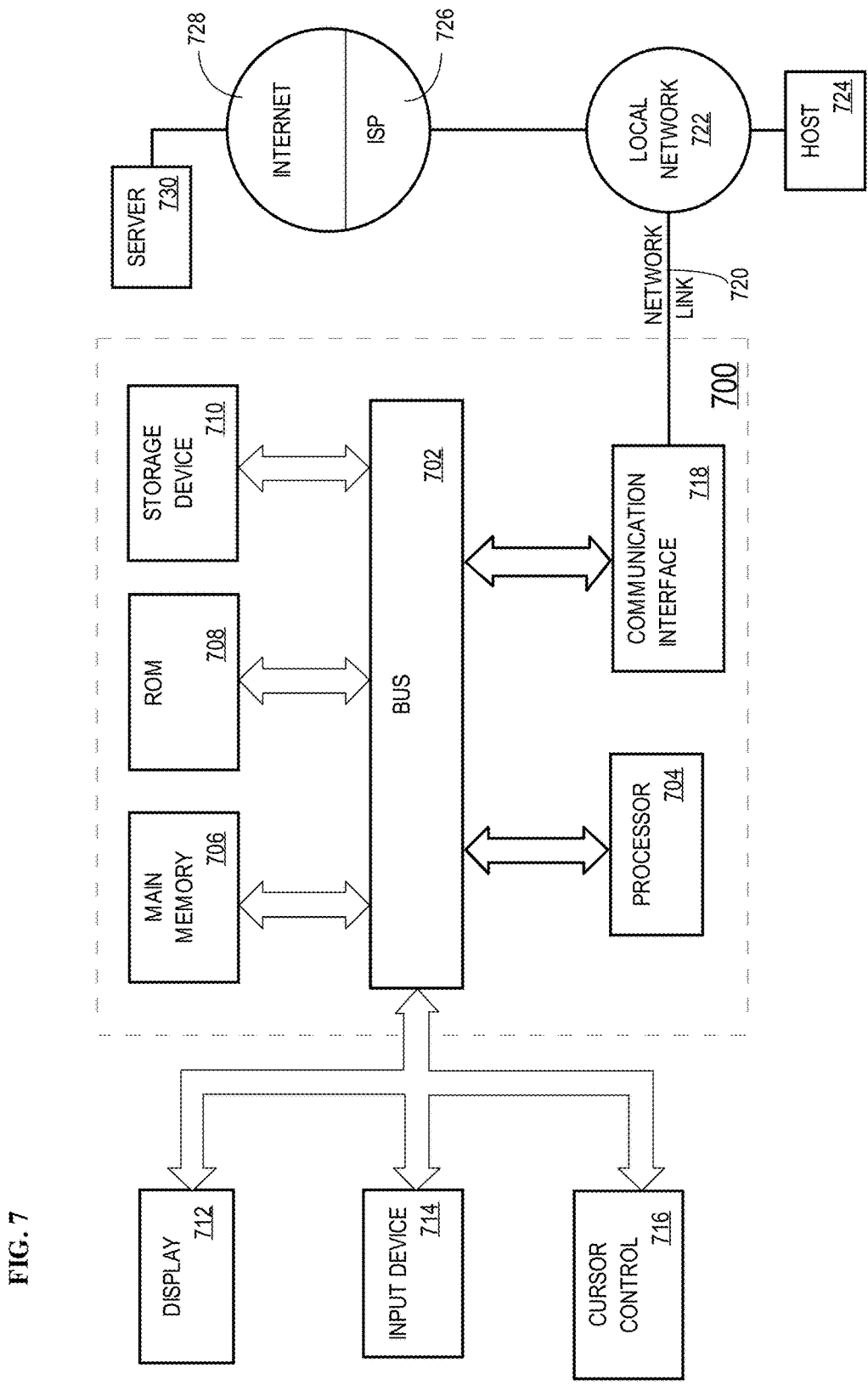
FIG. 7 is a block diagram of a system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving, at a first user device, a message from a server across a network, the message instructing the first user device to request a specific item of multimedia content from a second user device, the message transmitted to the first user device in response to receipt by the server of a request to view the specific item of multimedia content on a third user device and a determination by the server that the specific item of multimedia content is available from the second user device;
   responsive to the message, the first user device requesting the specific item of multimedia content from the second user device, wherein the second user device is different from the first user device and the server;

responsive to requesting the specific item of multimedia content, the first user device receiving the specific item of multimedia content from the second user device;

transcoding, at the first user device, the specific item of multimedia content into a format suitable for playback at the third user device;

sending the transcoded specific item of multimedia content from the first user device to the third user device.

2. The method of claim 1, wherein the second user device is a digital video recorder.

3. The method of claim 1, wherein the specific item of multimedia content is content recorded or downloaded by the second user device.

4. The method of claim 1, wherein the third user device is a portable device configured to receive the specific item over a local area network and/or wireless interface.

5. The method of claim 1, further comprising, prior to the first user device receiving the message:

receiving, by the third user device, from the server, a listing of content accessible at the second user device;

the third user device sending a request for the specific item of multimedia content to the server.

6. The method of claim 1, further comprising:

receiving, by the first user device, key information from the server;

using, by the first user device, the key information to establish a connection with the second user device.

7. The method of claim 1, wherein the first user device is a personal computing device.

8. One or more non-transitory computer-readable media storing instructions that, when executed by one or more computing devices, cause performance of:

receiving, at a first user device, a message from a server across a network, the message instructing the first user device to request a specific item of multimedia content from a second user device, the message transmitted to the first user device in response to receipt by the server of a request to view a specific item of multimedia content on a third user device and a determination by the server that the specific item of multimedia content is available from a second user device;

responsive to the message, the first user device requesting the specific item of multimedia content from the second user device, wherein the second user device is different from the first user device and the server;

responsive to requesting the specific item of multimedia content, the first user device receiving the specific item of multimedia content from the second user device;

transcoding, at the first user device, the specific item of multimedia content into a format suitable for playback at the third user device;

sending the transcoded specific item of multimedia content from the first user device to the third user device.

9. The one or more non-transitory computer-readable media of claim 8, wherein the second user device is a digital video recorder.

10. The one or more non-transitory computer-readable media of claim 8, wherein the specific item of multimedia content is content recorded or downloaded by the second user device.

11. The one or more non-transitory computer-readable media of claim 8, wherein the third user device is a portable device configured to receive the specific item over a local area network and/or wireless interface.

12. The one or more non-transitory computer-readable media of claim 8, wherein the instructions, when executed by the one or more computing devices, further cause performance of, prior to the first user device receiving the message:

receiving, by the third user device, from the server, a listing of content accessible at the second user device;

the third user device sending a request for the specific item of multimedia content to the server.

13. The one or more non-transitory computer-readable media of claim 8, wherein the instructions, when executed by the one or more computing devices, further cause performance of:

receiving, by the first user device, key information from the server;

using, by the first user device, the key information to establish a connection with the second user device.

14. The one or more non-transitory computer-readable media of claim 8, wherein the first user device is a personal computing device.

15. A system comprising:

a service provider server, executing on one or more computing devices coupled to a network; and a first user device configured to:

receive a message from the server across the network, the message instructing the first user device to request a specific item of multimedia content from a second user device, the message transmitted to the first user device in response to receipt by the server of a request to view a specific item of multimedia content on a third user device and a determination by the server that the specific item of multimedia content is available from a second user device;

responsive to the message, requesting the specific item of multimedia content from the second user device, wherein the second user device is different from the first user device and the server;

responsive to requesting the specific item of multimedia content, receiving the specific item of multimedia content from the second user device;

transcoding the specific item of multimedia content into a format suitable for playback at the third user device; and sending the transcoded specific item of multimedia content from the first user device to the third user device;

the second user device, configured to receive a request for the specific item of multimedia content from the first user device;

access the specific item of multimedia content; and send the specific item of multimedia content to the first user device.

16. The system of claim 15, wherein the second user device is a digital video recorder.

17. The system of claim 15, wherein the specific item of multimedia content is content recorded or downloaded by the second user device.

18. The system of claim 15, wherein the third user device is a portable device configured to receive the specific item over a local area network and/or wireless interface.

19. The system of claim 15, wherein the service provider server is further configured to, prior to the first user device receiving the message, send a listing of content accessible at the second user device to the third user device; and receive a request for the specific item of multimedia content from the third user device.

20. The system of claim 15, wherein the first user device is further configured to:
   receive key information from the service provider server; and
   use the key information to establish a connection with the second user device.

21. The system of claim 15, wherein the first user device is a personal computing device.

* * * * *